United States Patent
Chambers et al.

[11] 3,897,697
[45] Aug. 5, 1975

[54] INFINITELY VARIABLE DRIVE RATIO HYDRO-MECHANICAL TRANSMISSION FOR VEHICLES OR THE LIKE

[75] Inventors: Robert O. Chambers, Winchester, Mass.; Edwin E. Hanson, Peoria, Ill.

[73] Assignee: Caterpillar Tractor Co., Peoria, Ill.

[22] Filed: Feb. 1, 1974

[21] Appl. No.: 438,668

[52] U.S. Cl. .................................. 74/682; 74/687
[51] Int. Cl.[2] ................... F16H 37/06; F16H 47/04
[58] Field of Search .................. 74/682, 687, 705

[56] References Cited
UNITED STATES PATENTS

| | | | |
|---|---|---|---|
| 3,212,358 | 10/1965 | De Lalio | 74/687 |
| 3,468,192 | 9/1969 | Nasvytis | 74/682 |
| 3,580,107 | 5/1971 | Orshansky, Jr. | 74/687 |

*Primary Examiner*—Samuel Scott
*Assistant Examiner*—John Reep
*Attorney, Agent, or Firm*—Phillips, Moore, Weissenberger Lempio & Strabala

[57] ABSTRACT

A power transmission has an input section with planetary gearing providing a split power path from the input to a pair of idler gears wherein differing drive ratios exist in each branch of the split path. A hydraulic section having coupled variable displacement pump motor units links the two idler gears. By adjusting the displacements, the two idler gears may be constrained to rotate at any selected relative speed within a range of relative speeds and this enables progressive variation of the division of input power between the two branches of the split power path. An output section including additional planetary gearing provides for transmitting of power from either or both of the idler gears to an output means. Drive establishing devices in the input section provide for reversal of drive direction in each branch of the split power path and additional drive establishing devices in the output section provide for a plurality of speed ranges in both forward and reverse in each of which the infinite variation of drive ratio may be repeated. Drive establishing clutches and brakes need engage only under stationary conditions. These characteristics enable a single transmission configuration to be used in a variety of vehicles, of different power ratings, wherein a number of distinctly different transmissions have heretofore been necessary.

6 Claims, 15 Drawing Figures

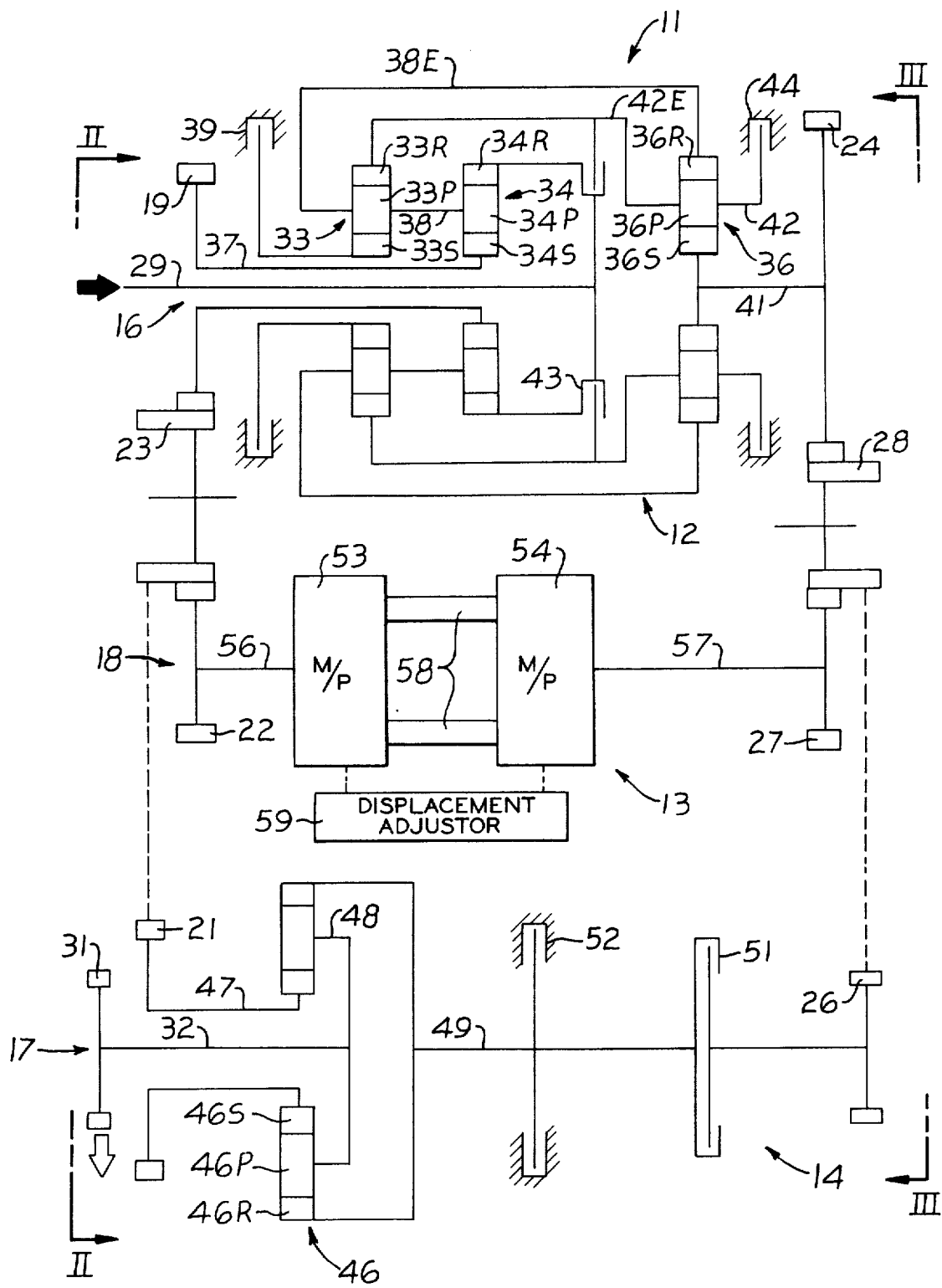

PATENTED AUG 5 1975          3,897,697
SHEET 2
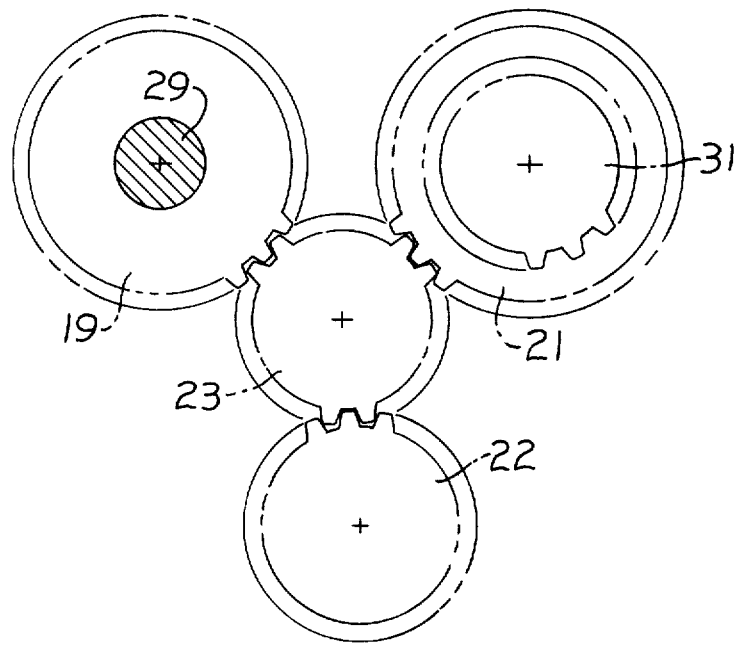
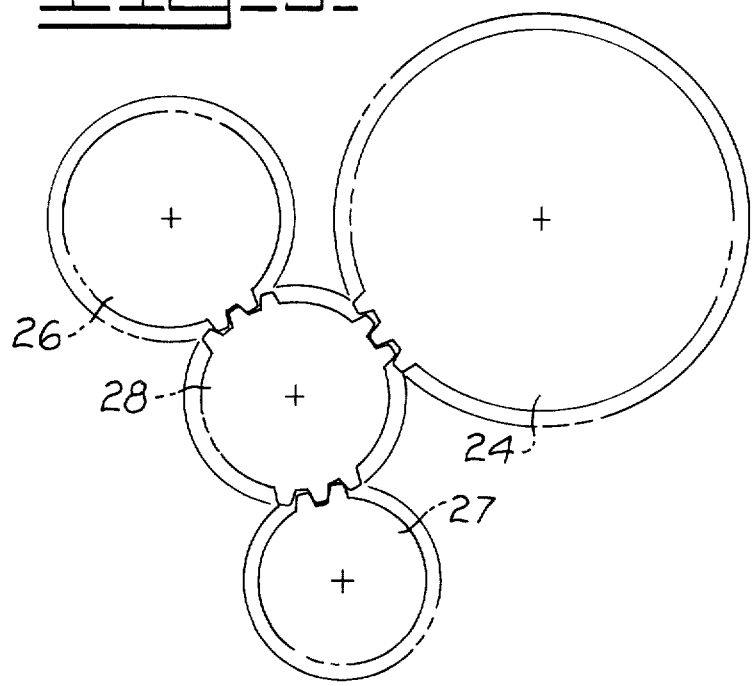

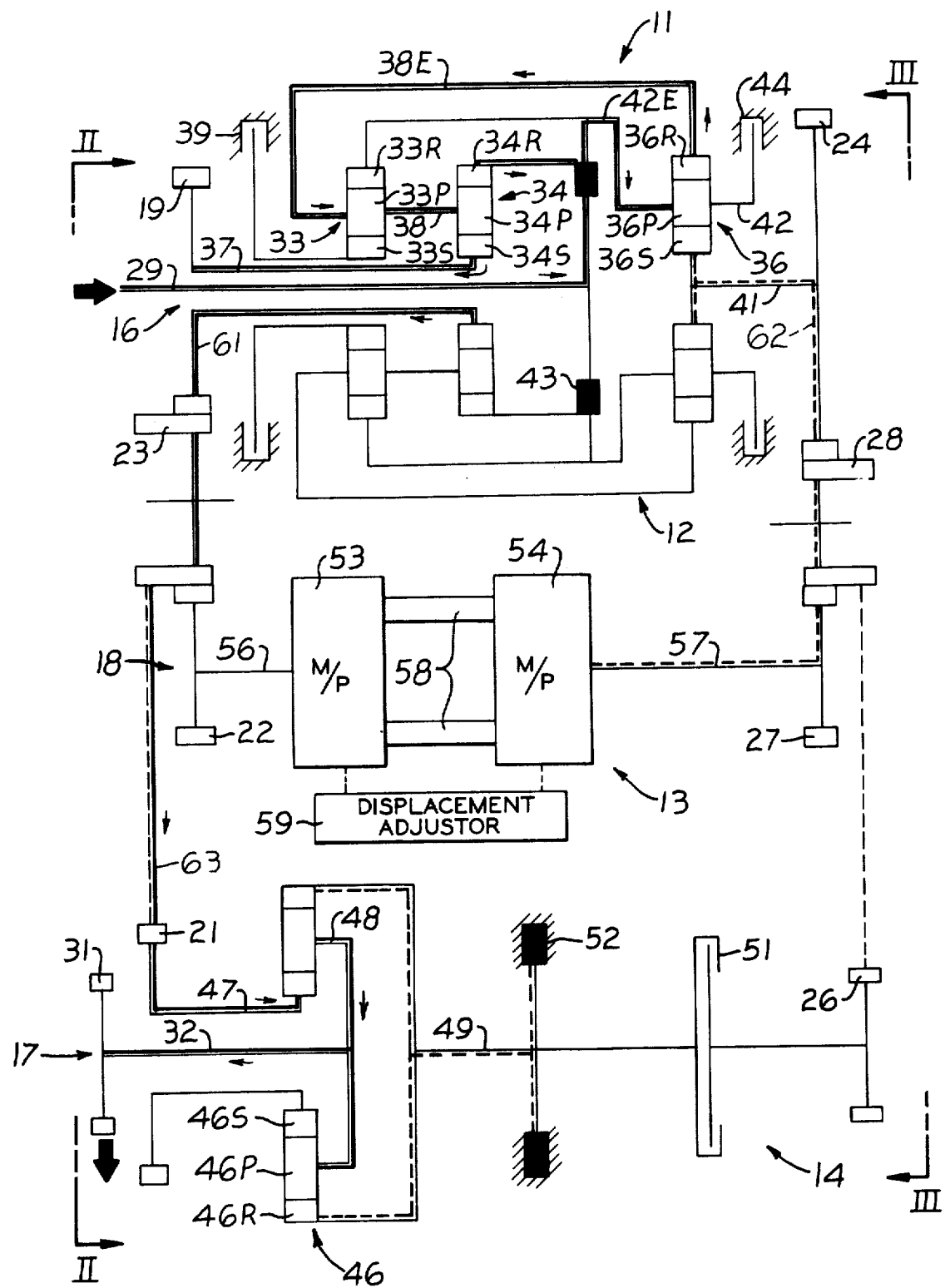

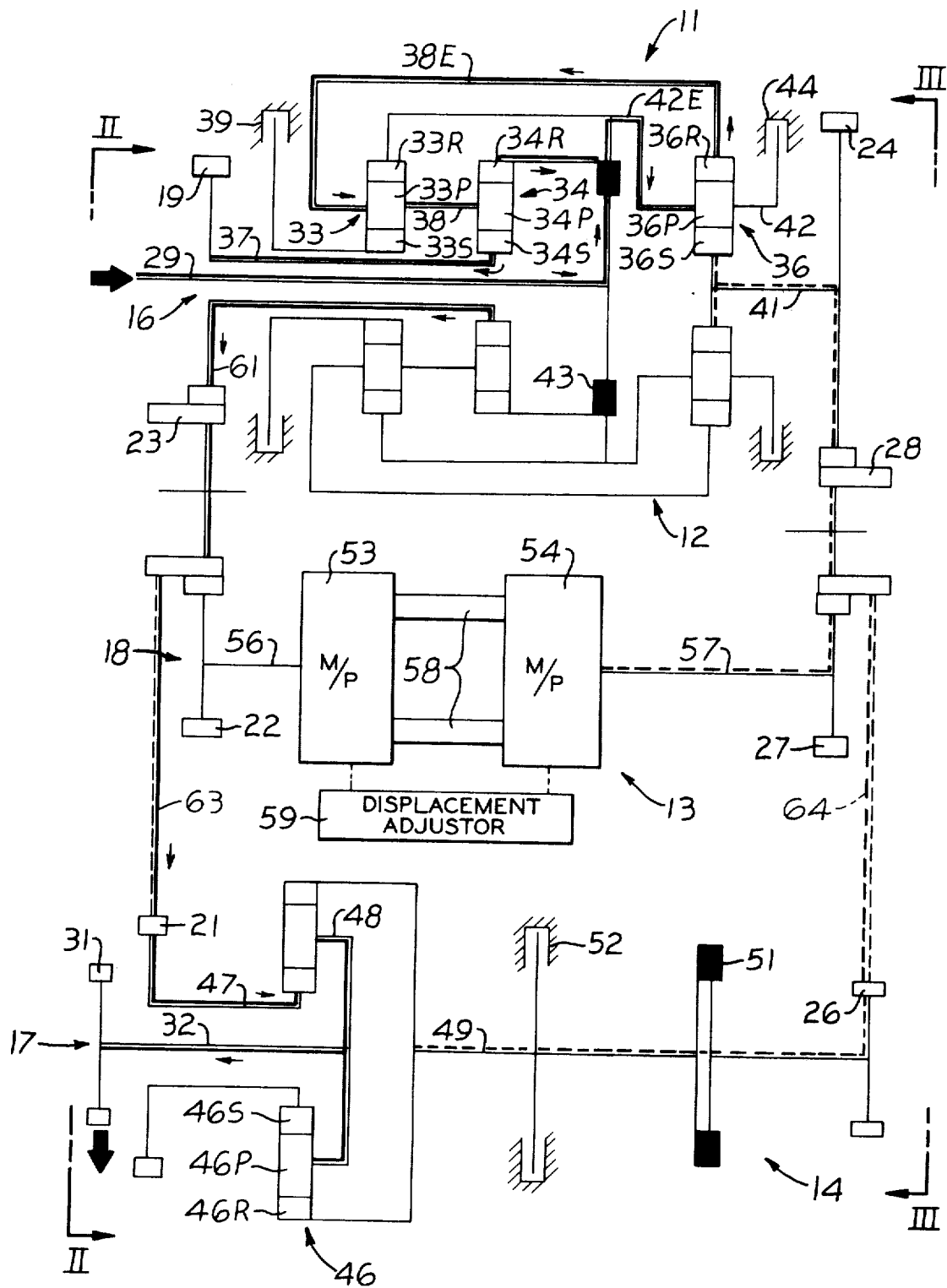

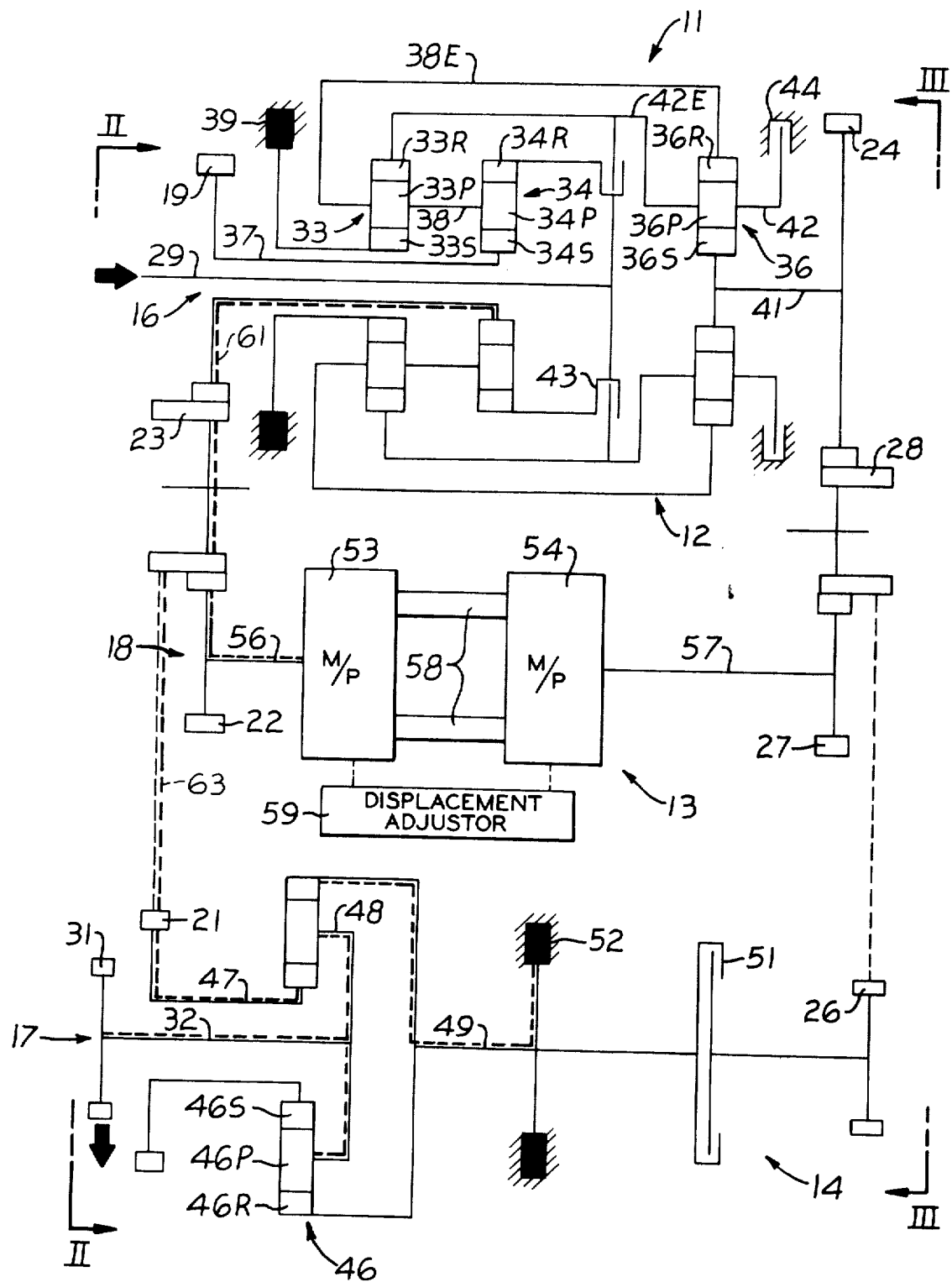

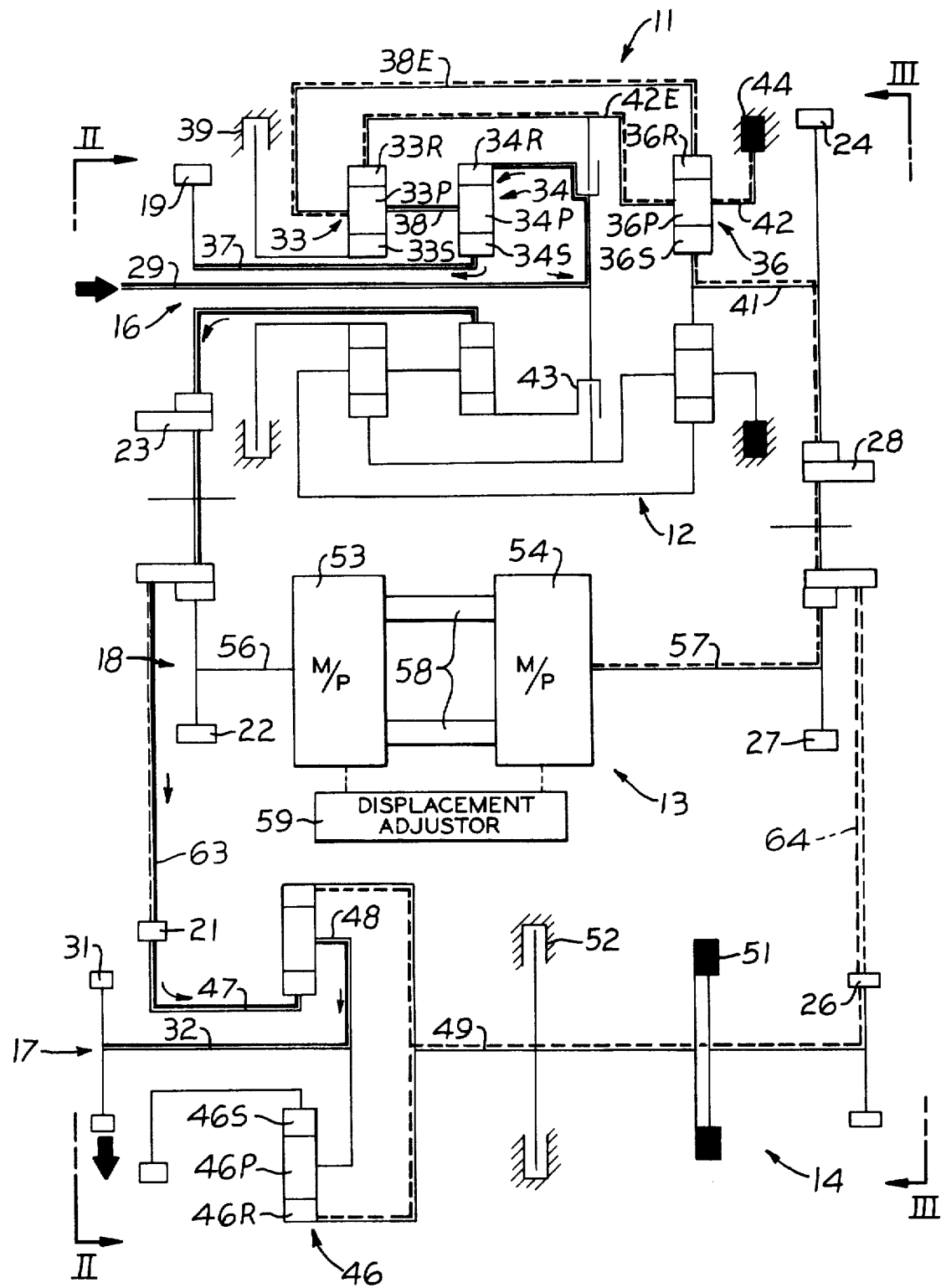

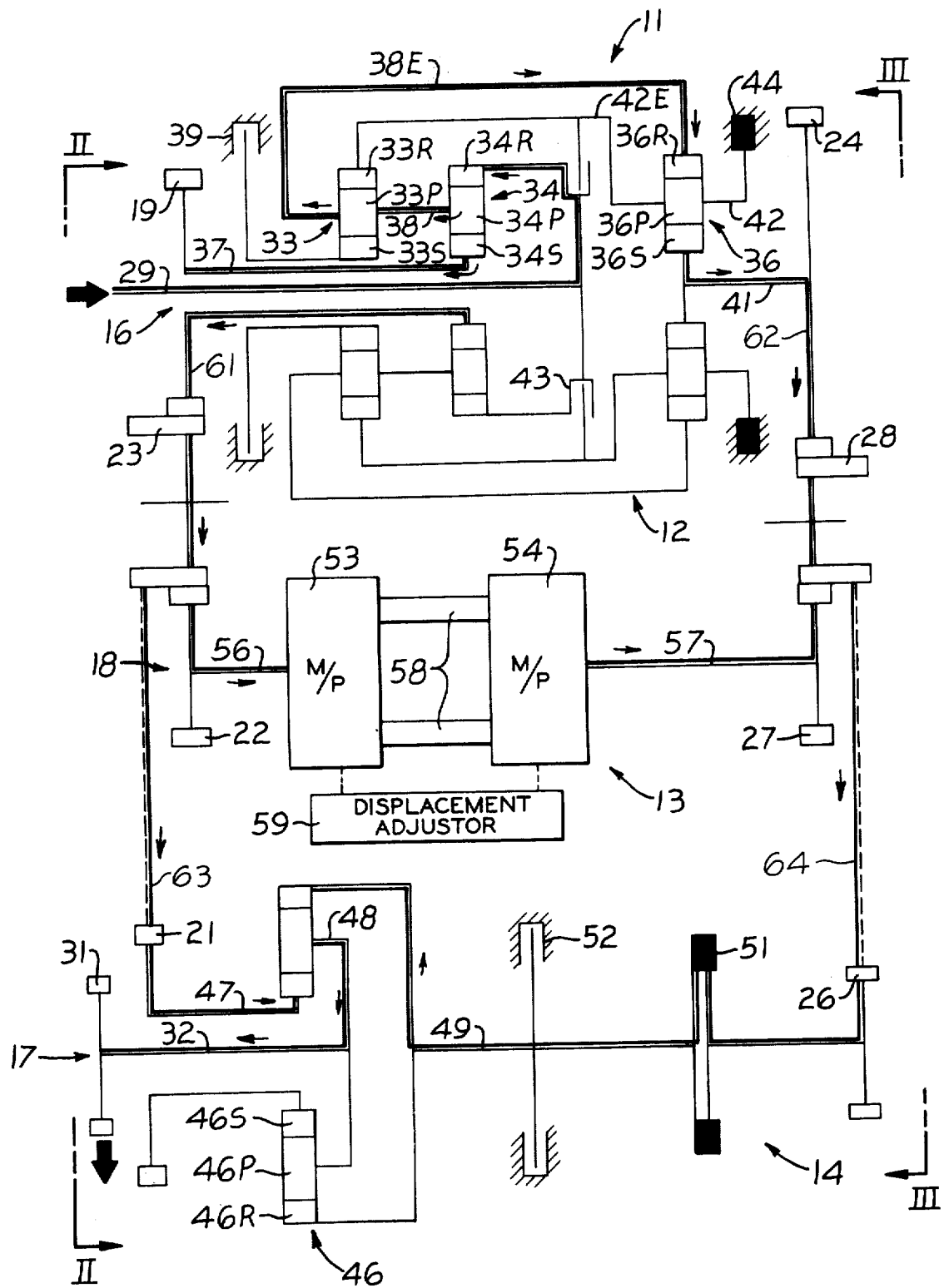
FIG_4L.

INFINITELY VARIABLE DRIVE RATIO HYDRO-MECHANICAL TRANSMISSION FOR VEHICLES OR THE LIKE

BACKGROUND OF THE INVENTION

This invention relates to power transmissions for varying the drive ratio between an engine and a load driven thereby.

Power transmissions as employed in vehicles basically serve the purpose of enabling a wide variation of vehicle ground speeds to be realized while utilizing an engine which is not capable of operating at a correspondingly wide range of engine speed with acceptable efficiency and power output. The majority of prior transmissions provide only a limited number of specific drive ratios between the engine and vehicle wheels. If the engine speed were to be maintained constant and other operating conditions were held constant as well, it would only be possible to realize a limited number of specific ground speeds by shifting the transmission. It is usually desirable that vehicle ground speeds be variable in an infinite manner. Accordingly, using prior transmissions, it is customary to vary the engine speed for this purpose after shifting of the transmission. However, an engine operates most efficiently at some one particular speed from the standpoint of producing maximum power from a given quantity of fuel. Certain other characteristics such as minimum emission of pollutants, are also usually optimal at one specific engine speed.

Thus it is preferable if the engine of the vehicle can be operated continuously at a single preferred speed. This objective can be achieved at least in part by utilizing a transmission which provides an infinitely variable drive ratio between the engine and the vehicle wheels. Provided that such a transmission offers a sufficiently wide range of drive ratio variation, the engine may be operated continually at the optimized engine speed while adjustments to change vehicle speed are accomplished with the transmission rather than by adjusting engine speed.

Considering now another characteristic of prior transmissions, it has heretofore been a practical necessity that distinctly different transmissions be provided for different varieties of vehicle or even for similar vehicles of different power rating. This is in part a result of the fact that only a limited number of specific drive ratios are available in the prior transmissions. Also, where drive conditioning clutches or brakes must engage while rotating under load, the capacity, size and cost of such devices must be increased for higher power throughputs. The need to manufacture a large number of different transmissions for different vehicles has been a major source of inefficiency in the industry. An infinitely variable drive ratio transmission in which clutches or brakes engage under low load and at synchronous speeds or at a stationary condition can greatly reduce the need for a proliferation of transmission designs. This is particularly true if changes in the limits of the drive ratio can readily be made without a general redesigning of the transmission as a whole.

Infinite variation of the drive ratio between the input and output of a transmission may be realized by driving a fluid pump with the input and hydraulically coupling the pump to a fluid motor which drives the output if at least one of the fluid devices has a selectively variable displacement. By adjusting the displacement, the speed of the fluid motor and the torque output thereof may be selectively varied relative to that of the pump. However, a purely hydraulic transmission of this kind does not provide a desirably broad range of drive ratio variation unless the assembly is excessively large, heavy and costly. Accordingly, attempts have heretofore been made to combine such hydraulic systems with change speed gearing systems. In these hybrid transmissions, the change speed gears provide for a plurality of successive specific fixed drive ratios through the transmission, while the associated hydraulic system provides for infinite variation of the drive ratio between the fixed drive ratio steps of the gearing. These prior transmission configurations of this general type have not met one or more of the desirable criteria discussed above.

SUMMARY OF THE INVENTION

This invention is a hydro-mechanical power transmission providing an infinitely variable drive ratio throughout a broad range of drive ratios in both forward and reverse drive directions and which is adaptable to engines of widely varying power ratings and to vehicles of a variety of different types without necessarily requiring changes in the size of components or basic changes in the transmission configuration.

The transmission has an input section with planetary gearing for splitting power flow from the input between two branched paths of different drive ratio and has drive conditioning devices for determining drive direction through each branch path. An output section has additional planetary gearing for transmitting power from either branch path or from both to an output and has drive conditioning devices for establishing any of a plurality of specific predetermined drive ratios within the output section. A hydraulic section has coupled variable displacement fluid translating devices providing an additional power flow channel between the two branches of the power path in which drive ratio may be infinitely varied by shifting the displacements of the fluid devices. This enables control of the division of power flow between the two branch paths to provide infinite variation of the overall drive ratio through the transmission within each of the successive specific forward and reverse drive ratio steps provided by the planetary gearing of the output section. The drive conditioning brakes and clutches need engage only under stationary conditions and changes of the limits of drive ratio variation may readily be made without major disassembly or redesign.

In a preferred form, the input, output and hydraulic sections are each situated at a separate one of three parallel shaft assemblies and are mutually coupled together by central idler gears engaged by transfer gears at each end of each section. This provides for desired power flow paths in a compact and economically manufactured configuration.

Accordingly, it is an object of this invention to provide a practical and economical and versatile power transmission providing an infinitely variable drive ratio throughout a broad range of both forward and reverse drive directions and which is adaptable to a variety of vehicles or the like of different designs and power ratings.

The invention together with further objects and advantages thereof will best be understood by reference to the following description of a preferred embodiment taken in conjunction with the accompanying drawings.

BRIEF DESCRIPTION OF THE DRAWINGS

In the accompanying drawings:

FIG. 1 is a schematic diagram of a hydro-mechanical power transmission embodying the invention, FIG. 2 is a diagrammatic front end view of certain of the transmission structure of FIG. 1 showing the preferred geometrical disposition of major shaft assemblies relative to each other, FIG. 3 is a diagrammatic back end view of the transmission of FIG. 1 further illustrating the preferred geometrical positioning of major shaft assemblies and gears therein, FIG. 4C depicts clutch and brake conditions and power flow at the upper end of the first forward speed range just prior to a shift of the transmission into high forward speed range, FIG. 4D depicts clutch and brake conditions and power flow at the low end of the high forward speed range immediately following a shift, FIG. 4G depicts clutch and brake conditions and power paths at the low end or stall point in low reverse speed range, FIG. 4K depicts clutch and brake conditions and power flow at the lower end of the high reverse speed range immediately following a shift of the transmission, FIG. 4L depicts clutch and brake conditions and power flow at an intermediate point in the high reverse speed range.

DESCRIPTION OF A PREFERRED EMBODIMENT

Figure 4A:
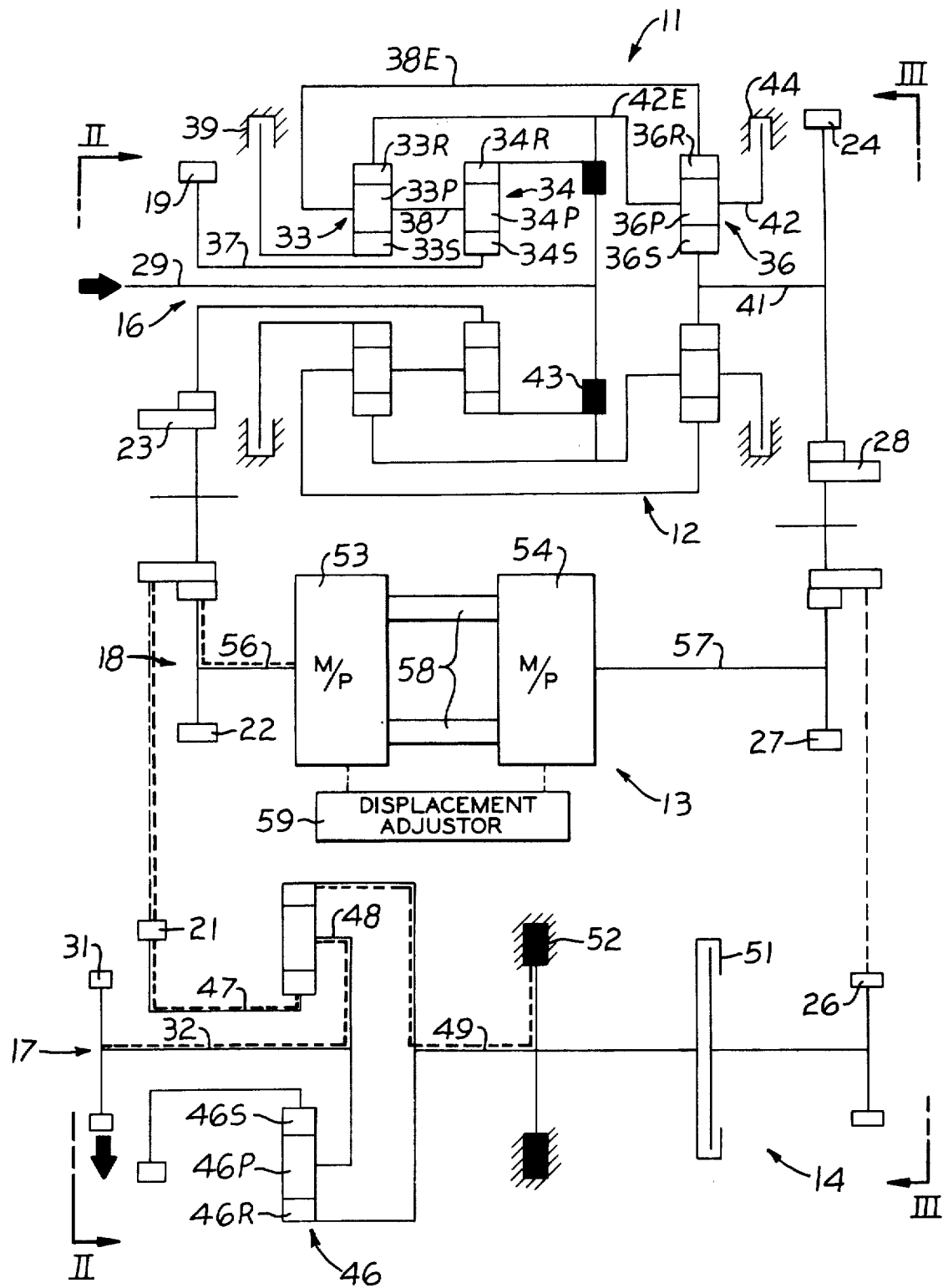
FIG. 4A depicts clutch and brake conditions and power paths in the transmission at forward drive and maximum speed reduction which condition is termed the stall condition as power is blocked from the output.

Referring now to FIG. 1 of the drawing, a transmission 11 in accordance with the invention has three principal sections including an input section 12, an output section 14 and a hydraulic section 13. Components of the input section are disposed along a first rotational axis defined by an input section shaft assembly 16 and components of the output section are disposed along a second parallel rotational axis defined by an output section shaft assembly 17. Components of the hydraulic section are disposed along a third parallel rotational axis defined by a hydraulic section shaft assembly 18.

As may be seen by reference to FIG. 2 in conjunction with FIG. 1, a transfer gear 19 at one end of the input section and a transfer gear 21 at the same end of the output section and a transfer gear 22 at the same end of the hydraulic section each engage with a single idler gear 23. As may be seen by reference to FIG. 3 in conjunction with FIG. 1, another transfer gear 24 at the other end of the input section, another transfer gear 26 at the other end of the output section and an additional transfer gear 27 at the other end of the hydraulic section all engage a single second idler gear 28. Idler gear 28 is of smaller diameter than idler gear 23 while transfer gears 24 and 21 are of larger diameter than transfer gears 19 and 26 respectively. By offsetting the rotational axis of idler gear 23 from that of idler gear 28, this mutual interconnection of corresponding ends of the three transmission sections through idler gears 23 and 28 may be realized with the three shaft assemblies 16, 17 and 18 being parallel and being angularly spaced around the idler gears.

Referring now again to FIG. 1 in particular, power from a driving engine or other source is supplied to the transmission through an input shaft 29 of the input section. Through an output gear 31 mounted on a shaft 32 of the output section, power may be transmitted to the wheels of a vehicle or other driven load. In addition to the other functions to be described, the input section 11 provides for selective reversal of the rotation of output gear 31 between forward and reverse drive directions while the output section 14 provides for a plurality of different drive ratios between idler gear 23 or 28 and output gear 31. In this example, the output section provides for a low speed range and a high speed range in both forward and reverse drive. Within either speed range in either drive direction, the hydraulic section 13 provides for selectively varying the drive ratio between input shaft 29 and idler gear 23 or 28 in an infinitely variable manner. Accordingly, a continuously variable drive ratio is obtainable through the transmission as a whole rather than the limited number of fixed predetermined drive ratios which are provided by conventional planetary transmissions. If the vehicle is accelerating and is initially in the low speed range, the speed reduction through the transmission may be progressively reduced from a maximum to a minimum value and then by up-shifting into high speed range speed reduction may be still further progressively reduced. Similarly, the speed reduction may be progressively increased as the vehicle is decelerated. Under many operating conditions, the driving engine may then be continually operated at a single preferred speed, typically the speed at which power production per unit of fuel is maximized, while the transmission 11 is used to control the ground speed of the vehicle.

Considering now the structure of the transmission in more detail, input section 12 has three spaced apart planetary gear sets 33, 34 and 36 each disposed coaxially with respect to the shaft assembly 16. Input shaft 29 is coupled to the ring gear 34R of planetary gear set 34 while the sun gear 34S thereof is coupled to the previously described transfer gear 19 through a hollow quill shaft 37 disposed coaxially with respect to the input shaft. The planet gears 34P of planetary gear set 34 are mounted on a carrier 38 which also supports the planet gears 33P of planetary gear set 33 and which has a sleeve extension 38E coupled to the ring gear 36R of planetary gear set 36. The sun gear 33S of planetary gear set 33 may be selectively held against rotation by actuation of a brake 39. The sun gear 36S of planetary gear set 36 is coupled through a shaft 41 to transfer gear 24 and the planet gears 36P of gear set 36 are mounted on a carrier 42 which has an extension 42E coupled to the ring gear 33R of gear set 33. A clutch 43 is connected between input shaft 29 and carrier 42E to selectively cause ring gears 33R and 34R to rotate synchronously with the input shaft and synchronously with orbital motion of planet gears 36P. An additional brake 44 provides for selective stopping of orbital motion of planet gears 36P and thus also stops rotational motion of ring gears 33R. Brakes 39 and 44, clutch 43 and the other such drive conditioning devices to be hereinafter described may be selectively engaged and disengaged through fluid pressure operated means or mechanical linkages of any of the forms well known to the art.

Elements of the input section 11 coact with elements of the output section 14 and hydraulic section 13 and thus the structural arrangement of the output section and hydraulic section will be described before discussing the operation of the input section in detail. However, it may be observed at this point that the input section 11 has two primary functions. One such function is to divide the flow of power from input shaft 29 between two branched paths. One branch through transfer gear 19 at one end of the input section provides a relatively high degree of speed reduction and the other branch through transfer gear 24 at the other end of the input section has a lesser degree of speed reduction. The division of power flow between the two branches to provide for a progressive variation of the overall drive ratio through the transmission is variable by adjustment of the hydraulic section 13 as will hereinafter be described in more detail. The other principal function of the input section 11 is to control drive direction through the transmission as a whole. As will be hereinafter discussed, engagement of clutch 43 establishes forward drive through the transmission in both high and low speed ranges while engagement of brake 39 causes reverse drive in low speed range and engagement of brake 44 causes reverse drive in the high speed range.

Considering now suitable components for the output section 14, an output section planetary gear set 46 has a sun gear 46S coupled for rotation with output section transfer gear 21 through a quill shaft 47 disposed coaxially with respect to output shaft 32. The planet gears 46P of gear set 46 are mounted on a carrier 48 which is coupled for rotation with output shaft 32. The ring gear 46R of gear set 46 is coupled for rotation with an intermediate shaft 49 which extends along the axis of shaft assembly 17 and which is selectively engageable with transfer gear 26 through a clutch 51. A brake 52 provides for selectively stopping rotation of shaft 49 and ring gear 46R.

A primary function of the output section 14 is to provide a plurality of successively higher speed ranges, in either drive direction, within each of which the continuously variable drive ratio change provided by the input section and hydraulic section may be repeated, in both the forward and reverse drive directions.

Hydraulic section 13 is comprised of two variable displacement fluid translating devices 53 and 54, which are preferably of the hydrostatic type, the rotor shaft 56 of device 53 being coupled to transfer gear 22 while the rotor shaft 57 of device 54 is coupled to transfer gear 27. The fluid ports of translating devices 53 and 54 are interconnected by suitable conduits 58 whereby if torque is applied to the rotor of one device causing it to function as a pump, the other device is hydraulically driven by the first device and functions as a motor. The drive ratio between the hydraulically coupled devices 53 and 54 is determined by the displacements in each of the two devices. If the device which is functioning as a pump is set to have a large displacement while the other device which is functioning as a motor has a relatively small displacement, then the motor device turns at a substantially greater speed but lower torque than the pump device. Conversely if the pumping device is set to relatively small displacement while the motor device has relatively large displacement, a speed reduction with a corresponding increase in torque is realized. Within a range set by the maximum possible displacements of the devices 53 and 54, any desired drive ratio and torque ratio through the hydraulic section may be selectively achieved in an infinitely variable manner. A suitable displacement adjustor 59 provides for selective control of the displacements of the two devices 53 and 54 in an inverse relationship wherein shifting of device 53 from zero displacement to maximum displacement is accompanied by shifting of device 54 from maximum displacement to zero displacement and vice versa. At the midpoint of the displacement adjustment, where the displacements of the two devices 53 and 54 are equal, there is a one-to-one drive ratio through the hydraulic section.

Suitable internal constructions for the fluid translating devices 53 and 54 including displacement adjustment means 59 are not described in detail herein inasmuch as such devices, apart from the context of the present transmission, are well known to the art. One example of a variable displacement fluid translating device usable as a hydrostatic pump or motor is disclosed in prior U.S. Pat. 3,274,946.

The primary function of the hydraulic section 13 is to couple the two idler gears 23 and 28 through means having a controllable infinitely variable drive ratio so that each idler gear is constrained to rotate at a selected speed relative to rotation of the other. As the idler gears are coupled to reaction members of the planetary gear sets, this enables progressive changing of the division of power flow through parallel paths of different drive ratio. This in turn enables the overall drive ratio between the input shaft 29 and output gear 31 of the transmission to be continuously varied throughout the low drive range in either drive direction and then enables further continuous variation of the drive ratio after upshifting into the high drive range.

The operation of the transmission as a whole will best be understood by considering the flow of power between the input shaft 29 and the output gear 31 at several different operating conditions of the transmission as depicted in FIGS. 4A to 4M. In FIGS. 4A to 4M heavy solid lines indicate the paths of power flow through the transmission under the several conditions to be described, while heavy dashed lines indicate the paths of static torque forces sufficiently high to immobilize the components associated with such dashed lines.

FIG. 4A illustrates the condition of the transmission which obtains at the low end of the first forward speed range which is termed the stall point as it is the condition which normally exists when the output gear 31 is immobilized by a load too great to be driven by the available power. This condition is selected to be described initially since it is the condition at which controls are adjusted to provide the maximum possible speed reduction and maximum torque increase through the transmission.

To condition the transmission for low range forward drive, clutch 43 of the input section and brake 52 of the output section are engaged. To establish the maximum possible speed reduction fluid device 53 is adjusted to maximum displacement while device 54 is adjusted to zero displacement. With either of the devices 53 and 54 at zero displacement and the other at maximum displacement, power cannot flow through the hydraulic section 13 and idler gears 23 and 28 are effectively decoupled from each other. With output gear 31 immobilized by an excessive load and with output section ring gear 46R immobilized by brake 52, the sun gear 46R of gear set 46 is also immobilized and through shaft 47, transfer gear 21, idler gear 23 and transfer gear 22, the rotor 56 of device 53 is immobilized. As clutch 43 of the input section is engaged, carrier 42 and ring gears 33R and 34R are constrained to rotate synchronously with the input shaft 29. As sun gear 34S is immobilized, by the connection to idler gear 23 through shaft 37 and gear 19, sun gear 36S is forced to rotate and turns device 54 through shaft 41, gear 24, idler gear 28, and hydraulic section gear 27 and rotor shaft 57. The rotating elements of the input section and hydraulic section serve to lightly load the input shaft 29 to limit engine torque.

Figure 4B:
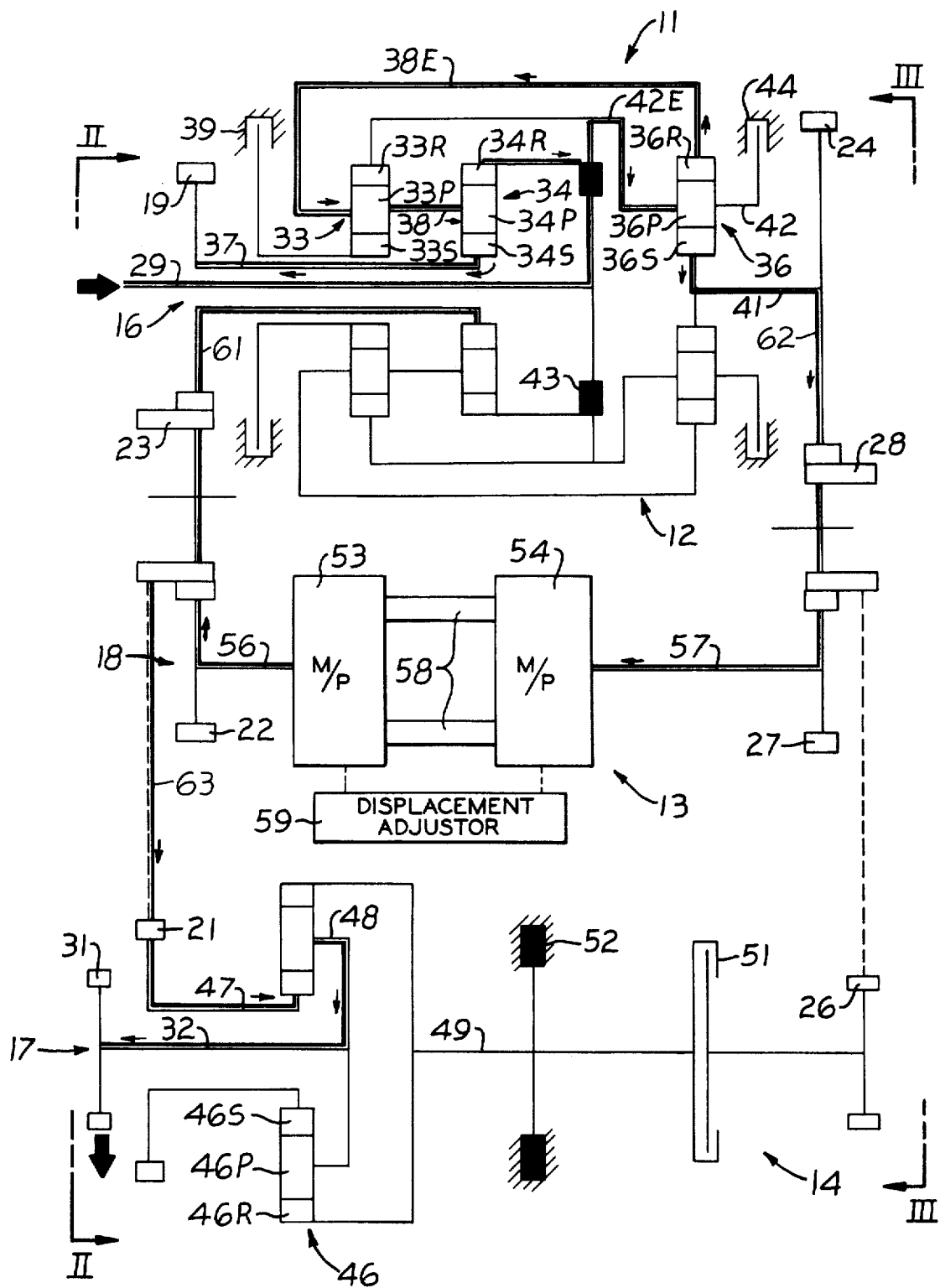
FIG. 4B depicts clutch and brake conditions and power flow paths at an intermediate point in the first forward speed range of the transmission.

FIG. 4B depicts power flow through the transmission at an intermediate point in the low forward speed range when the load on the transmission output is not so high as to create a stalled condition. Clutch and brake engagements remain the same as described above, but hydraulic device 53 has been shifted away from maximum displacement to, for example, three-fourths of maximum displacement, while device 54 has been correspondingly increased from zero displacement to one-fourth of maximum displacement. Under this condition, power may flow to the hydraulic section 13 towards idler gear 23 while being reduced in speed and correspondingly increased in torque. Owing to the differential action of the planetary gearing, a branched power path exists between input shaft 29 and idler gear 23, one branch 61 extending through transfer gear 19 and the other branch 62 extending through transfer gear 24 and the hydraulic section 13. In particular, input power is transmitted through clutch 43 to carrier 42 where the power flow divides at planet gears 36P with one portion 62 flowing to idler gear 23 through sun gear 36S, shaft 41, gear 24, idler gear 28, gear 27, shaft 57, devices 53 and 54, shaft 56 and gear 22. The other portion of the input power which is divided out at planet gears 36P flows through ring gear 36R, carrier extension 38E and carrier 38 to planet gears 34P. At planet gears 34P, a portion of such power is recirculated to carrier 42 while the remainder is transmitted through sun gear 34S, shaft 37, and gear 19 to idler gear 23 where it is combined with the power received at idler gear 23 through the hydraulic section 13. The components of the two power paths 61 and 62 provide two different drive ratios between input shaft 29 and idler gear 23 and thus the net speed reduction is a function of the division of the power flow between the two paths. This division is in turn controllable by adjusting the displacement setting of the devices 53 and 54. When device 53 has been adjusted to near maximum displacement, power flow is almost wholly through path 62 with a sizeable speed reduction and corresponding torque increase. As the displacement of device 53 is reduced from maximum an increasing proportion of the power flow is through path 61 at a lesser speed reduction. When device 53 has been shifted to zero displacement as depicted in FIG. 4C, power flow is wholly through path 61 at a relatively smaller speed reduction or higher drive ratio, while sun gear 36S is immobilized by the connection to device 54, which is at maximum displacement and zero speed, through rotor shaft 57, gear 27, idler gear 28, transfer gear 24, and shaft 41. Assuming the vehicle will continue to be accelerated, FIG. 4C depicts the conditions which exist just prior to an upshift into high forward speed range.

Throughout the cycling of the system through the first forward speed range as described above, the power transmitted to idler gear 23 through the two power paths 61 and 62 is transmitted to sun gear 46S of the output section through transfer gear 21 and quill shaft 47. As ring gear 46R is held stationary by brake 52, planet gears 46P are constrained to orbit and thereby turn the output gear 31 through carrier 48 and shaft 32, the gear set 46 acting to establish a further fixed speed reduction between idler gear 23 and output gear 31.

FIG. 4D depicts conditions immediately following an upshift into high forward speed range by engagement of clutch 51 and disengagement of brake 52. As both shaft 49 and transfer gear 26 of the output section are immobile at the shift point, the clutch engagement is made under zero speed conditions and may slightly precede the release of brake 52. Thus, the drive conditioning devices such as clutch 51 need not be bulky high energy capacity devices.

At the time of the upshift from forward low range to forward high range, power flow conditions and thus the overall speed reduction through the transmission momentarily remain as described as above with reference to FIG. 4C with the sole change, as depicted in FIG. 4D, being that ring gear 46R of the output section is no longer being held immobilized by the brake 52, but is instead now immobilized by connection to the immobilized rotor 57 of device 54 through clutch 51, transfer gear 26, idler gear 28 and transfer gear 27.

Figure 4E:
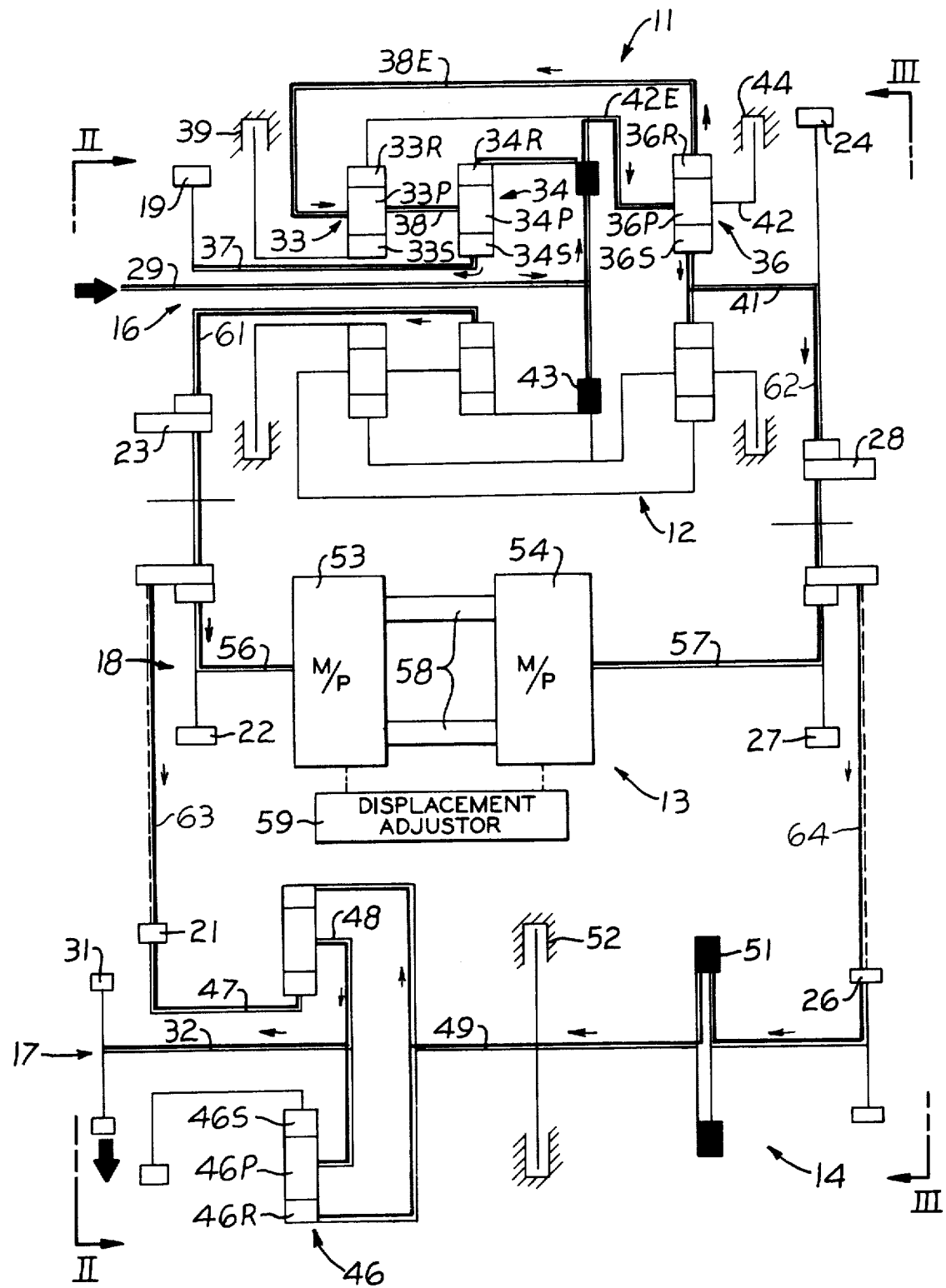
FIG. 4E depicts clutch and brake conditions and power flow at an intermediate point in the high forward speed range.

To progress through the high forward speed range, the displacements of devices 53 and 54 are now reshifted back towards the original condition. Specifically, device 54 is progressively shifted away from the maximum displacement setting while device 53 is correspondingly shifted away from the zero displacement setting. FIG. 4E depicts the power flow conditions at an intermediate stage in this process. Power now flows to the output section 14 through an additional path 64 from the other idler gear 28 through transfer gear 26 engaged clutch 51, shaft 49 and ring gear 46R, as well as through the previously described path 63 from idler gear 23 to output section sun gear 46S, the two power flows being cumulative at planet gears 46P. Power now flows through the hydraulic section 13 in an opposite direction from the flow therethrough in low forward speed range. The power transmitted to idler gear 23 through branch power flow path 61 now divides at that idler gear with one portion being transmitted to the output section through path 63 while the other portion is transmitted to the other idler gear 28 through the hydraulic section 13 to combine with the power flow received at that idler gear through path 62. The combined power flows at idler gear 28 are transmitted to the output section through path 64. As the displacement of devices 53 and 54 is progressively shifted, an increasingly larger portion of the total power flow reaches the output section through power path 64 instead of power path 63 which has a relatively larger speed reduction. Thus, the net speed reduction through the transmission is still further decreased.

Figure 4F:
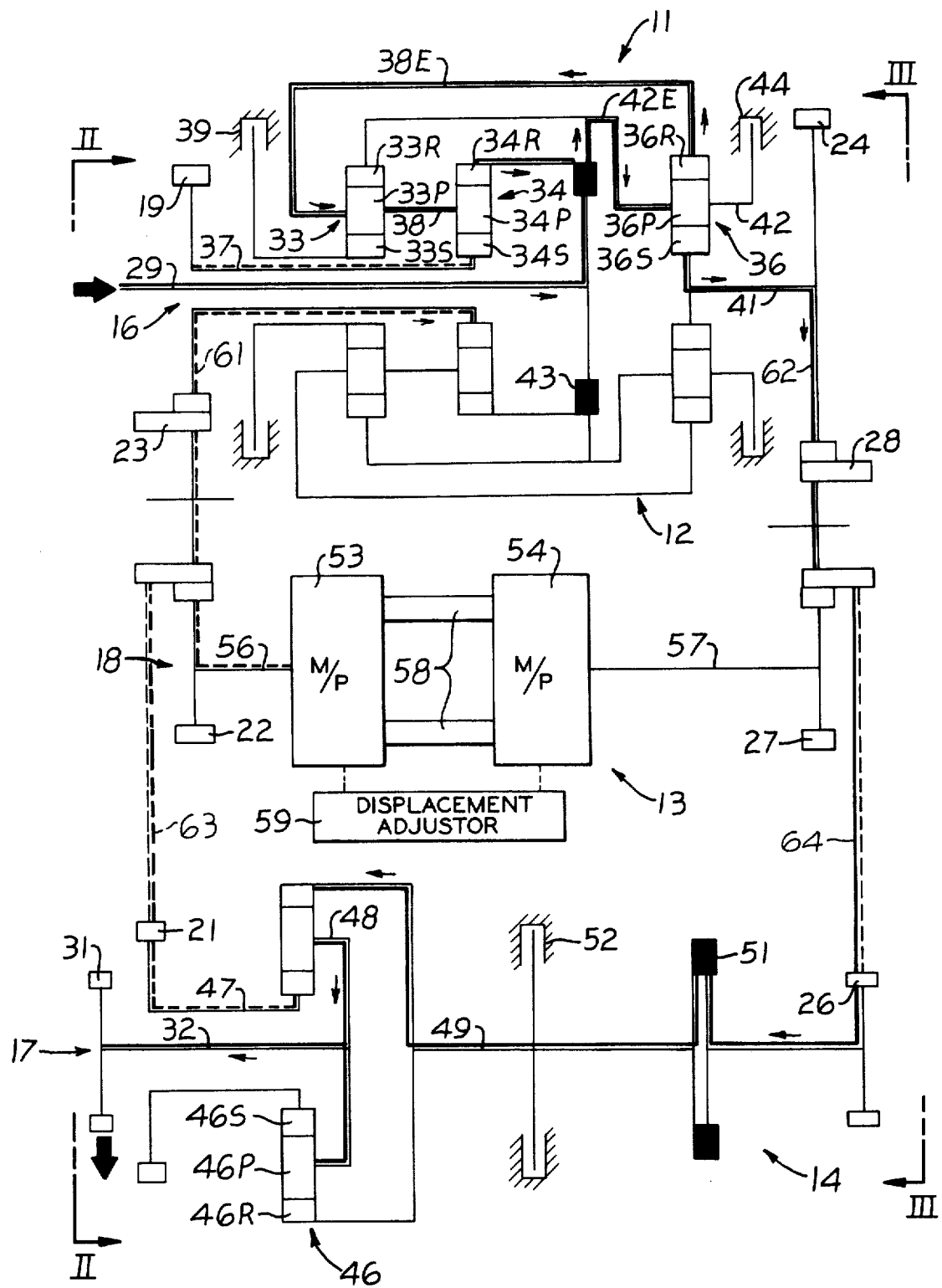
FIG. 4F depicts clutch and brake conditions and power flow at the upper end of the high forward speed range.

When shifting of the displacement of devices 53 and 54 has been completed to the point where device 54 again has zero displacement and maximum speed while device 53 has maximum displacement and zero speed, the condition depicted in FIG. 4F is reached at which the overall speed reduction through the transmission has been decreased to the minimum and thus the highest obtainable drive ratio exists. At this time the maximum displacement, zero speed condition of device 53 immobilizes sun gear 34S of the input section through power path 61 and immobilizes the sun gear 46S of the output section through power path 63. All power thus flows between the input and output section through paths 62 and 64.

An essentially similar but reversed action occurs in the two reverse drive speed ranges, as depicted in FIGS. 4G to 4M. FIG. 4G illustrates conditions which exist in reverse low range at stall. Reverse low range is established by engaging brake 39 of the input section and brake 52 of the output section. Setting of device 53 at maximum displacement with device 54 at zero displacement establishes the largest possible gear reduction through the system. Device 53, idler gear 23 and all components associated with power paths 61 and 63 are immobilized creating the stall condition depicted in FIG. 4G. Under non-stall conditions, reverse motion of the vehicle is initiated by progressively reducing the displacement of device 53 while correspondingly increasing the displacement of device 54 in a direction opposite to that used in the forward direction to progressively reduce the torque applied to idler gear 23 through the hydraulic section 13.

Figure 4H:
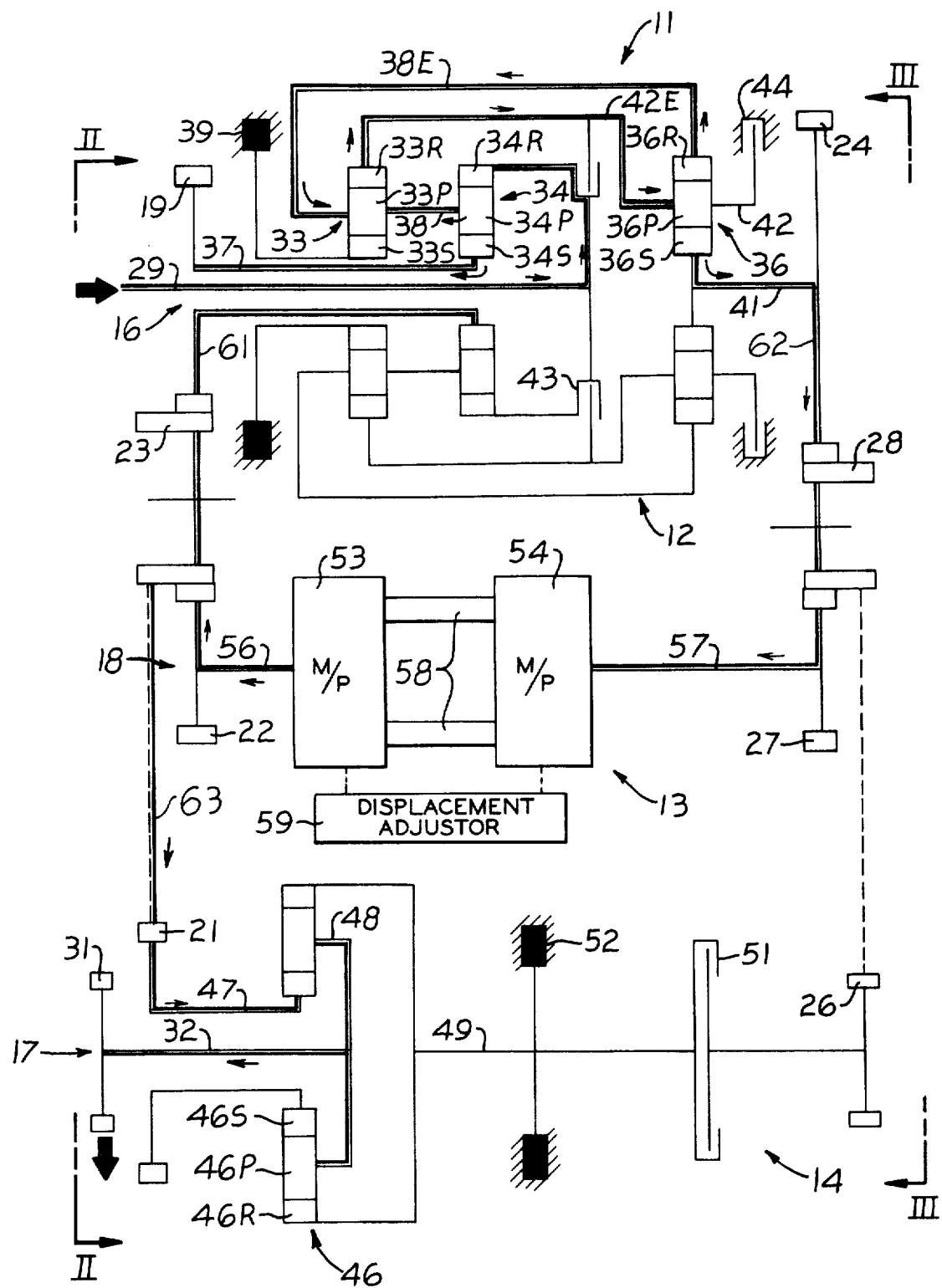
FIG. 4H depicts clutch and brake conditions and power paths at an intermediate point within the low reverse speed range.

FIG. 4H depicts power flow conditions at an intermediate point in reverse low range within the input section. Sun gear 33S is held stationary by brake 39. Accordingly, input power from shaft 29 divides at planet gears 34P with a portion being transmitted to idler gear 23 through flow path 61 and another portion being transmitted to planet gear 33P and then to planet gear 36P through carrier extension 42E and carrier 42. At planet gear 36P, the power flow divides again with one portion being recirculated to planet gear 33P through carrier extension 38E and with the other portion being transmitted to idler gear 28 through power path 62. That portion of the power flowing through path 62 is transmitted through the hydraulic section 13 at a drive ratio determined by the displacement of the devices 53 and 54 to be delivered to the other idler gear 23 where it is cumulative with the power received at idler gear 23 through power path 61. From idler gear 23, the summed power flow is transmitted through path 63 to sun gear 46S of the output section. As ring gear 46R is held immobile by brake 52, planet carrier 48 of the output section is rotated to turn output gear 31. As in the case of the forward speed ranges, the division of power flow between path 61 and the path 62 of relatively greater speed reduction is determined by the displacements of the devices 53 and 54 and if the vehicle is to be accelerated the displacements are progressively shifted so that an increasing proportion of the power flow is through path 61 wherein less speed reduction occurs.

Figure 4J:
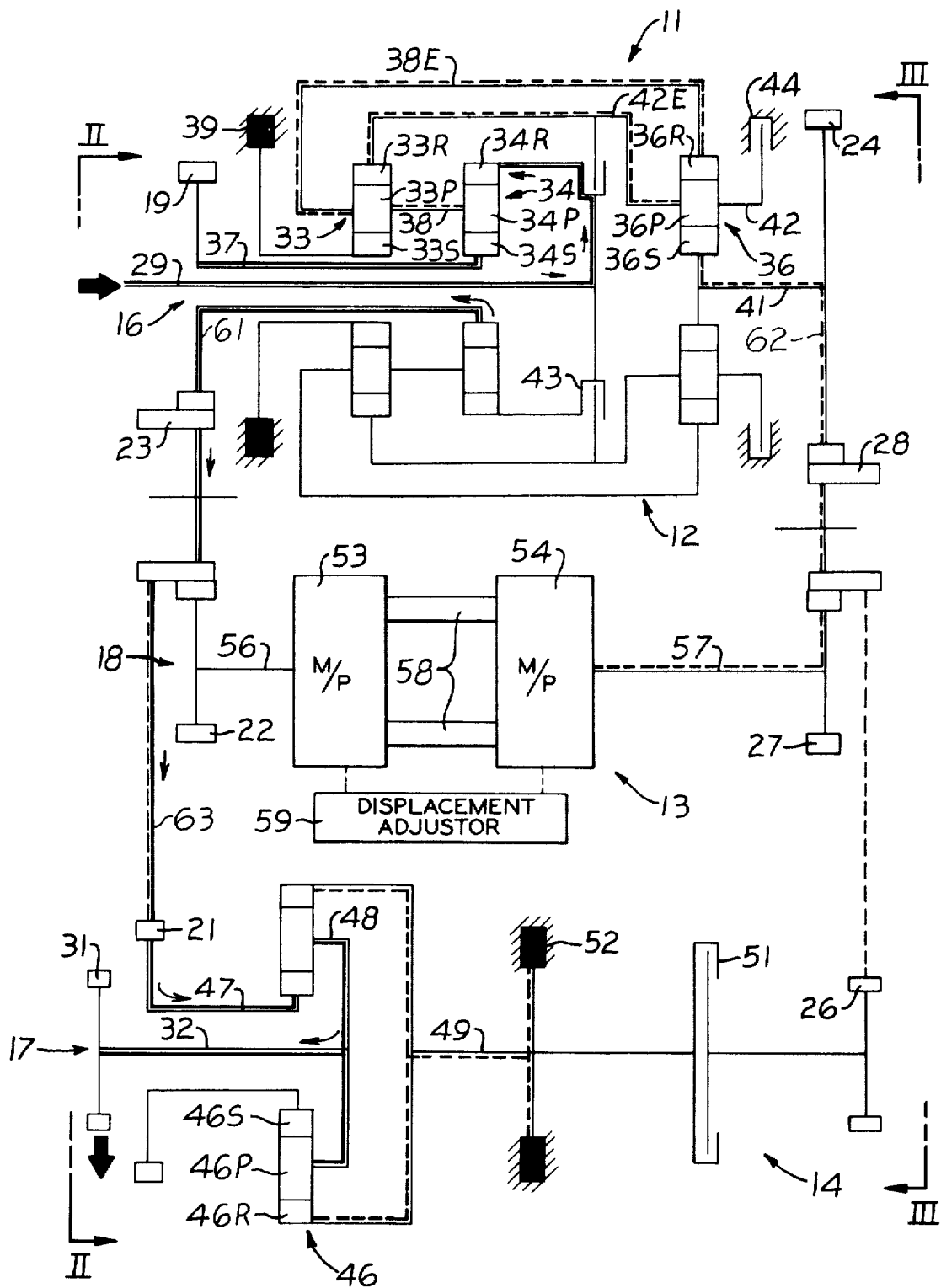
FIG. 4J illustrates clutch and brake conditions and power flow at the upper end of the low reverse speed range prior to a shift of the transmission.
Figure 4M:
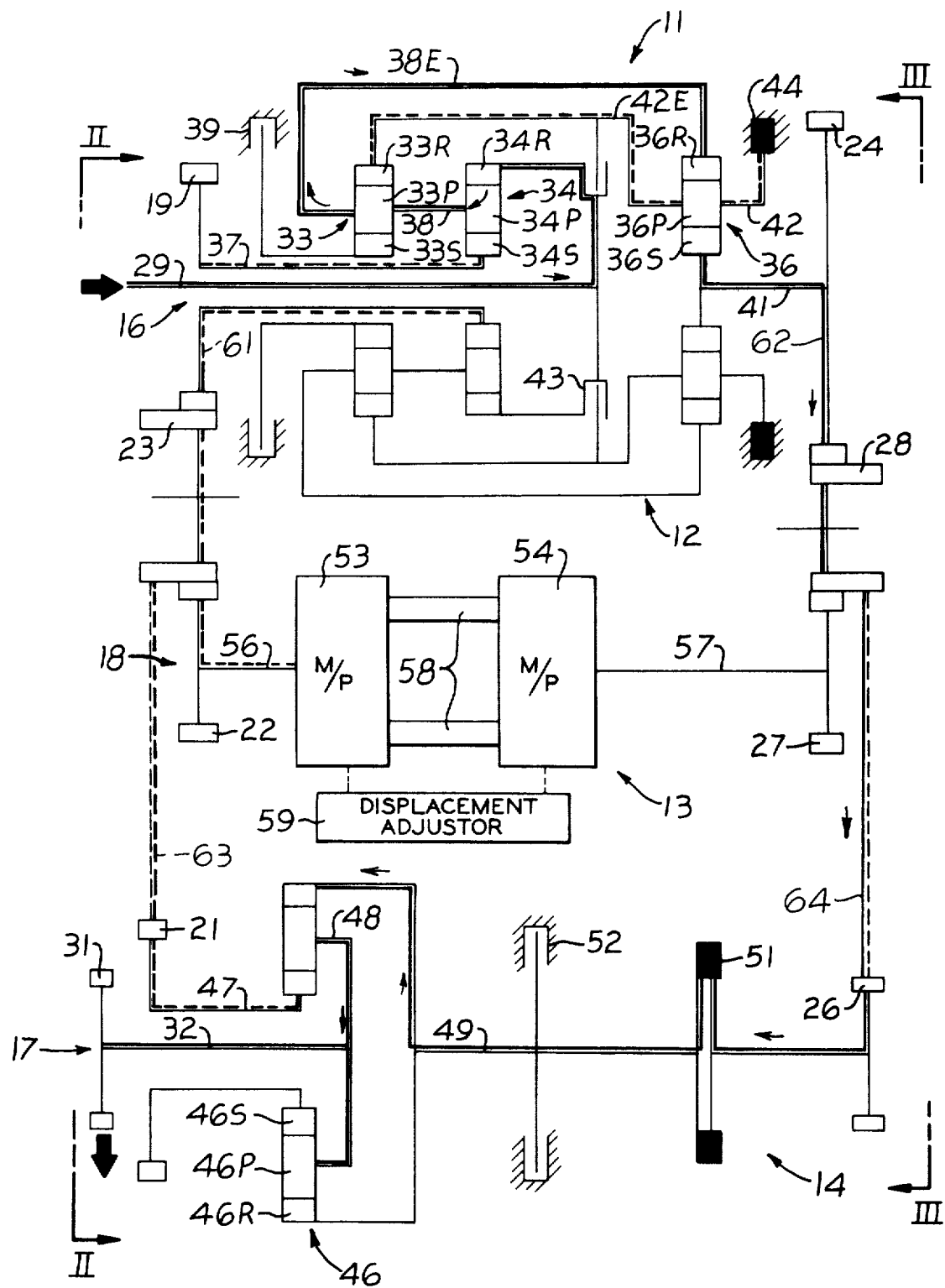
FIG. 4M depicts clutch and brake conditions and power flow at the upper end of the high reverse speed range.

FIG. 4J depicts the power flow conditions at the upper end of reverse low range just prior to an upshift into reverse high range. Device 53 has at this point been shifted to a condition of zero displacement while device 54 has been shifted to maximum displacement and power flow through the hydraulic section 13 has ceased. The maximum displacement zero speed device 54 has, through power path 62, immobilized all components of planetary gear sets 36 and 33 including carrier 38. Accordingly, all power from input shaft 29 is transmitted to ring gear 34R which through planet gears 34P turns sun gear 34S in a reverse direction. All input power thus flows through paths 61 and 63 to sun gear 46S of the output section. This, in turn, causes planet gears 46P to orbit within the immobilized ring gear 46R forcing carrier 48 to turn the output gear 31 through shaft 32.

An upshift from reverse low range to reverse high range is accomplished by engaging brake 44 of the input section and clutch 51 of the output section while disengaging clutch 39 and brake 52 as depicted in FIG. 4K. Until the displacements of device 53 and 54 are shifted, the power flow paths remain similar to what existed just prior to the shift as described above with reference to FIG. 4J, except that the ring gear 46R of the output section is now being held immobilized by the device 54 rather than by brake 52. It should be observed that the necessary clutch and brake engagements are again accomplished with the involved clutches and brakes in a stationary condition.

To further increase the reverse drive ratio through the transmission, the displacement of device 53 is again gradually increased in a direction opposite to that used in the forward direction while that of device 54 is correspondingly decreased. This enables power to flow through the hydraulic section 13 again as shown in FIG. 4L which illustrates power flow conditions at an intermediate point in reverse high range. With brake 44 of the input section engaged, carrier 42 is immobilized thereby immobilizing ring gear 33R and preventing orbital motion of planet gears 36P. As ring gear 34R turns with the input shaft 29, power divides at planet gears 34P with a portion of such power being transmitted to idler gear 23 through flow path 61 while the other portion is transmitted to idler gear 28 through carrier 38, carrier extension 38E, and ring gear 36R. Rotation of ring gear 36R turns sun gear 36S in an opposite direction through planet gears 36P and the rotation of the sun gear 36S is transmitted to idler gear 28 through flow path 62.

The power transmitted through flow path 61 as described above is again divided at idler gear 23 with a portion passing through the hydraulic section 13 to idler gear 28 while the other portion is transmitted to sun gear 46S of the output section through path 63. That portion which passes through the hydraulic section is summed at idler gear 28 with the power flow through path 62 and these combined power flows are transmitted to ring gear 46R of the output section through path 64 including the engaged clutch 51 and shaft 49. The power flows through both paths 63 and 64 then recombine at output section planetary gear set 46 to turn carrier 48 and thus shaft 32 and output gear 31 at a rate determined by the relative division of power between the paths 63 and 64 to opposite ends of the output section. This division of power is determined by the displacement settings of the devices 53 and 54 as hereinbefore described. As the vehicle accelerates, the displacements of devices 53 and 54 are shifted in the direction of increasing the displacement of device 53 and decreasing the displacement of device 54 to arrive at the power flow conditions depicted in FIG. 4M which are illustrative of the upper end of the reverse high speed range. At this point, the hydraulic device 53 is at maximum displacement and zero speed and through power paths 61 and 63 immobilizes the sun gear 34S of the input section and the sun gear 46S of the output section. Accordingly, power from input shaft 29 flows wholly through power paths 62 and 64 to turn ring gear 46R of the output section while components associated with power path 61 and 63 including the sun gear 46S of the output section are immobilized. This is the condition at which minimum gear reduction or maximum drive ratio is realized through the transmission 11 in reverse.

As may be seen from the foregoing description of conditions at specific times, input section 11 gearing functions as a differential to divide input power between flow paths 61 and 63. Power may also be exchanged between these paths through hydraulic section 13. The power flows are combined prior to delivery to the output gear 31. Each of the paths of power flow have a different drive ratio or degree of gear reduction and thus the overall drive ratio between the input and output of the transmission depends on the division of power between these routes. Such division is determined by the hydraulic section 13 and may be progressively varied from one extreme to the other and then back again in the next higher mechanically determined drive range. The engagement of clutches and brakes to shift drive ranges is always accomplished under stationary conditions enabling relatively low energy capacity clutches and brakes to be employed. The preferred physical arrangement of the structure in the form of three parallel shaft assemblies mutually linked together at each end by transfer gears and a pair of idler gears enables gear size changes, to vary the limits of the drive ratio range, to be readily accomplished without dismantling more than one section of the transmission.

While the invention has been described with respect to a single preferred embodiment, it will be apparent that many modifications are possible and it is not intended to limit the invention except as defined in the following claims.

We claim:

1. A power transmission providing a drive ratio which is infinitely variable between predetermined maximum and minimum drive ratios comprising:
   a power input transmission section having rotatable input means and first and second transfer gears and having first planetary gearing means connected between said input means and both of said transfer gears for providing a split input section power flow path from said input means to both of said transfer gears wherein the division of power flow is determined by the relative speeds of said first and second transfer gears, said power input transmission section further having directional drive conditioning means coupled to said first planetary gearing means for selectively reversing the direction of rotation of said first transfer gear relative to that of said input means and for independently selectively reversing the direction of rotation of said second transfer gear relative to that of said input means,
   a hydraulic transmission section having third and fourth transfer gears and having a pair of variable displacement fluid translating devices with interconnected fluid ports for exchanging fluid, one of said devices having a rotor coupled to said third transfer gear and the other of said devices having a rotor coupled to said fourth transfer gear whereby said third and fourth transfer gears may be constrained to rotate at selected relative speeds by adjustment of the relative displacements of said devices,
   a power output transmission section having rotatable output means and fifth and sixth transfer gears and having second planetary gearing means for transmitting power to said output means from either of said fifth and sixth transfer gears, and
   first drive transmitting means intercoupling said first and third and fifth transfer gears and second drive transmitting means intercoupling said second and fourth and sixth transfer gears.

2. A power transmission providing a drive ratio which is infinitely variable between predetermined maximum and minimum drive ratios comprising:
   a power input transmission section having rotatable input means and first and second transfer gears and having first planetary gearing means connected between said input means and both of said transfer gears for providing a split input section power flow path from said input means to both of said transfer gears wherein the division of power flow is determined by the relative speeds of said first and second transfer gears,
   a hydraulic transmission section having third and fourth transfer gears and having a pair of variable displacement fluid translating devices with interconnected fluid ports for exchanging fluid, one of said devices having a rotor coupled to said third transfer gear and the other of said devices having a rotor coupled to said fourth transfer gear whereby said third and fourth transfer gears may be constrained to rotate at selected relative speeds by adjustment of the relative displacements of said devices,
   a power output transmission section having rotatable output means and fifth and sixth transfer gears and having second planetary gearing means for transmitting power to said output means from either of said fifth and sixth transfer gears, and
   first drive transmitting means intercoupling said first and third and fifth transfer gears and second drive transmitting means intercoupling said second and fourth and sixth transfer gears, said first and second drive transmitting means including first and second spaced apart idler gears disposed for rotation about parallel axes, said first and third and fifth transfer gears each being engaged with said first idler gear, and said second and fourth and sixth transfer gears each being engaged with said second idler gear,
   wherein said first and second transfer gears are disposed at opposite ends of a first shaft means which extends parallel to said axes, said third and fourth transfer gears are disposed at opposite ends of a second shaft means which extends parallel to said axes, and said fifth and sixth transfer gears are disposed at opposite ends of a third shaft means which extends parallel to said axes, said first and second and third shaft means being angularly spaced apart around said idler gears.

3. A power transmission as defined in claim 2 wherein said first idler gear has a diameter exeeding that of said second idler gear, said second transfer gear has a diameter exceeding that of said first transfer gear, said fifth transfer gear has a diameter exceeding that of said sixth transfer gear and said third and fourth transfer gears are of equal diameter.

4. A power transmission providing a drive ratio which is infinitely variable between predetermined maximum and minimum drive ratios comprising:
- a power input transmission section having rotatable input means and first and second transfer gears and having first planetary gearing means connected between said input means and both of said transfer gears for providing a split input section power flow path from said input means to both of said transfer gears wherein the division of power flow is determined by the relative speeds of said first and second transfer gears, wherein said first planetary gearing means includes a first planetary gear set having a sun gear coupled to a low range reverse brake means for selectively stopping rotation of said sun gear and having a planet gear supported on a carrier and having a ring gear coupled to forward drive clutch means for selectively clutching said ring gear to said input means, a second planetary gear set having a sun gear coupled to said first transfer gear and a planet gear also supported on first carrier of said first planetary gear set and a ring gear coupled to said input means, and a third planetary gear set having a sun gear coupled to said second transfer gear and a planet gear supported on a carrier which is coupled to said ring gear of said first planetary gear set and selectively clutchable to said input means through said forward drive clutch means and further having a ring gear which is coupled to said carrier of said first planetary gear set,
- a hydraulic transmission section having third and fourth transfer gears and having a pair of variable displacement fluid translating devices with interconnected fluid ports for exchanging fluid, one of said devices having a rotor coupled to said third transfer gear and the other of said devices having a rotor coupled to said fourth transfer gear whereby said third and fourth transfer gears may be constrained to rotate at selected relative speeds by adjustment of the relative displacements of said devices,
- a power output transmission section having rotatable output means and fifth and sixth transfer gears and having second planetary gearing means for transmitting power to said output means from either of said fifth and sixth transfer gears, and
- first drive transmitting means intercoupling said first and third and fifth transfer gears and second drive transmitting means intercoupling said second and fourth and sixth transfer gears.

5. A power transmission providing a drive ratio which is infinitely variable between predetermined maximum and minimum drive ratios comprising:
- a power input transmission section having rotatable input means and first and second transfer gears and having first planetary gearing means connected between said input means and both of said transfer gears for providing a split input section power flow path from said input means to both of said transfer gears wherein the division of power flow is determined by the relative speeds of said first and second transfer gears,
- a hydraulic transmission section having third and fourth transfer gears and having a pair of variable displacement fluid translating devices with interconnected fluid ports for exchanging fluid, one of said devices having a rotor coupled to said third transfer gear and the other of said devices having a rotor coupled to said fourth transfer gear whereby said third and fourth transfer gears may be constrained to rotate at selected relative speeds by adjustment of the relative displacements of said devices,
- a power output transmission section having rotatable output means and fifth and sixth transfer gears and having second planetary gearing means for transmitting power to said output means from either of said fifth and sixth transfer gears, wherein said second planetary gearing means includes a planetary gear set having a sun gear coupled to said fifth transfer gear and a planet gear supported on a carrier which is coupled to said output means and having a ring gear coupled to a low range brake means for selectively stopping rotation of said ring gear and which is selectively clutchable to said sixth transfer gear through a high range clutch means, and
- first drive transmitting means intercoupling said first and third and fifth transfer gears and second drive transmitting means intercoupling said second and fourth and sixth transfer gears.

6. A power transmission comprising:
- first and second axially spaced apart rotatable idler gears,
- a transmission input section having a first and second and third input section planetary gear sets axially spaced apart along a rotational axis which is parallel to that of said first idler gear and having an input shaft disposed along said axis and a first transfer gear engaged with said first idler gear and a second transfer gear engaged with said second idler gear, said first input section planetary gear set having a sun gear and a planet gear supported on a carrier and a ring gear, said second input section planetary gear set having a sun gear coupled to said first transfer gear and a planet gear mounted on a carrier which is linked to said carrier of said first input section planetary gear set and having a ring gear coupled to said input shaft, said third input section planetary gear set having a sun gear coupled to said second transfer gear and a planet gear supported on a carrier which is coupled to said ring gear of said first input section planetary gear set and having a ring gear which is coupled to said carrier of said first planetary gear set, said transmission input section having a low range reverse brake for stopping rotation of said sun gear of said first planetary gear set and a high range reverse brake for stopping rotation of said carrier of said third planetary gear set and a forward drive clutch for coupling said input shaft to said carrier of said third planetary gear set, a hydraulic transmission section having a third transfer gear engaged with said first idler gear and a fourth transfer gear engaged with said second idler gear and having a pair of hydraulically coupled variable displacement fluid translating devices coupled between said third and fourth transfer gears, and a transmission output section having a fifth transfer gear engaged with said first idler gear and a sixth transfer gear engaged with said second idler gear with said transfer gears being axially spaced apart along a rotational axis parallel with that of said first idler gear, and having an output section planetary gear set disposed coaxially with respect to said fifth and sixth transfer gears, said output section planetary gear set having a sun gear coupled to said fifth transfer gear and having a planet gear supported on a carrier and having a ring gear, said output section further having an output shaft coupled to said carrier for rotation therewith and a low range brake for stopping rotation of said ring gear of said output section planetary gear set and a high range clutch for selectively coupling said ring gear of said output section planetary gear set to said sixth transfer gear.

* * * * *